(12) United States Patent
Breuer et al.

(10) Patent No.: US 7,669,467 B2
(45) Date of Patent: Mar. 2, 2010

(54) ADHESIVE JOINT FOR JOINING COMPONENTS OF TRANSPORT CRAFT, IN PARTICULAR OF AIRCRAFT, AND METHOD FOR DETERMINING MINIMUM MECHANICAL LOAD CAPACITY AND/OR MECHANICAL STRENGTH OF AN ADHESIVE JOINT

(75) Inventors: Ulf Breuer, Grasberg (DE); Barnaby Law, Weyhe (DE)

(73) Assignee: Airbus Deutschland GmbH (DE)

( * ) Notice: Subject to any disclaimer, the term of this patent is extended or adjusted under 35 U.S.C. 154(b) by 1036 days.

(21) Appl. No.: 11/316,306

(22) Filed: Dec. 22, 2005

(65) Prior Publication Data

US 2006/0159513 A1 Jul. 20, 2006

(30) Foreign Application Priority Data

Dec. 22, 2004 (DE) ............... 10 2004 063 098

(51) Int. Cl.
*G01B 21/08* (2006.01)
(52) U.S. Cl. ............................................. 73/150 A
(58) Field of Classification Search ............ 73/150 A, 73/760–860
See application file for complete search history.

(56) References Cited

U.S. PATENT DOCUMENTS

| | | | |
|---|---|---|---|
| 4,164,164 A * | 8/1979 | Trungold | 411/10 |
| 5,841,034 A * | 11/1998 | Ball | 73/800 |
| 6,127,822 A | 10/2000 | Sasahara et al. | |
| 6,282,063 B1 * | 8/2001 | Coon | 360/245.3 |
| 6,550,341 B2 * | 4/2003 | van Schoor et al. | 73/775 |
| 6,637,276 B2 * | 10/2003 | Adderton et al. | 73/862.41 |
| 6,714,297 B1 | 3/2004 | Ruckstuhl et al. | |
| 6,993,975 B2 * | 2/2006 | Borzabadi et al. | 73/754 |
| 2002/0054422 A1 * | 5/2002 | Carr et al. | 359/291 |
| 2004/0245504 A1 | 12/2004 | Sage et al. | |
| 2005/0006151 A1 * | 1/2005 | Mattson et al. | 177/1 |

FOREIGN PATENT DOCUMENTS

| | | |
|---|---|---|
| DE | 199 11 779 A1 | 9/2000 |
| EP | 0 573 778 A1 | 12/1993 |
| WO | WO-87/02745 | 5/1987 |

\* cited by examiner

*Primary Examiner*—Max Noori
(74) *Attorney, Agent, or Firm*—Lerner, David, Littenberg, Krumholz & Mentlik, LLP

(57) ABSTRACT

This invention relates to an adhesive joint for joining components of transport craft, in particular of aircraft, wherein the adhesive joint is formed by an adhesive means. According to the invention, the adhesive means has several functional elements with actuatory and/or sensory properties, in particular for enabling a minimum mechanical load capacity of the adhesive joint and/or detecting a mechanical loading state in the adhesive joint. Due to the presence of functional elements integrated in the adhesive joint direct and simple testing of the mechanical load capacity of the adhesive joint is possible without costly external test structures, e.g. in the form of measuring and testing systems for conducting tensile load tests or the like. Moreover, mechanical stress states in the adhesive joint can be detected. Moreover, the invention relates to a method for determining a minimum mechanical load capacity and/or mechanical strength of an adhesive joint.

12 Claims, 3 Drawing Sheets

ADHESIVE JOINT FOR JOINING COMPONENTS OF TRANSPORT CRAFT, IN PARTICULAR OF AIRCRAFT, AND METHOD FOR DETERMINING MINIMUM MECHANICAL LOAD CAPACITY AND/OR MECHANICAL STRENGTH OF AN ADHESIVE JOINT

BACKGROUND OF THE INVENTION

This invention relates to an adhesive joint for joining components of transport craft, in particular of aircraft, wherein the adhesive joint formed by an adhesive means.

In addition, the invention relates to a method for determining a minimum mechanical load capacity and/or a mechanical strength of an adhesive joint for joining components of transport craft, in particular of aircraft, wherein in the adhesive joint formed by an adhesive means, several functional elements with actuatory and/or sensory properties are integrated.

In particular in airplane construction, components are increasingly joined together by gluing, on the one hand to simplify the production process, and on the other hand to save weight with respect to conventional riveted and/or welded joints. In this respect, monitoring the observance of strength values of the adhesive joints made between the components has thus far turned out to be very complex.

In accordance with the state of the art, the actual mechanical load capacity of adhesive joints between components can be tested e.g. by mechanical tensile tests.

In such destructive testing of an adhesive joint, the force acting on the components joined by the adhesive joint is increased by a measuring and testing system until the adhesive joint fails mechanically so that the components are no longer usable. This procedure can be implemented advantageously in particular for determining and defining appropriate basic process parameters, such as pressure, temperature, and their effective duration in time, when making adhesive joints between components. Moreover, this procedure is also appropriate for sample type inspection of the maximum mechanical load capacity of adhesive joints, wherein the problem of insufficient representativity regarding the total amount of adhesive joints produced may result. Furthermore, the usually very expensive destroyed components are then no longer suitable for further installation or further operation, so that this destructive test procedure is not suitable for general quality assurance of current production.

In other test methods, such as load testing, two components joined by the adhesive joint are clamped into a complex measuring and testing system, wherein the force acting on the adhesive joint is increased by the measuring and testing system only until inside the adhesive joint, a previously defined mechanical stress occurs which excludes failure of the adhesive joint under all possible later operating conditions with a sufficiently high probability. Although conducting such nondestructive load tests with extensive measuring and testing systems would improve the assurance of quality of glued components during current production, it turns out to be too complex in practical operation, because e.g. for various components, special adapter devices would have to be provided, so that the components preferably only be charged in one measuring and testing system with respectively comparable and defined forces.

Also, ultrasound or X-ray inspections on adhesive joints cannot completely replace the execution of load tests, because although e.g. cavitations or delaminations can be detected nondestructively therewith, it is not possible to make any reliable statements on the actual mechanical load capacity of the adhesive joint.

Moreover, an inspection of the mechanical strength of an adhesive joint, e.g. by tensile tests, on components that are difficult to access in the practical version proves to be extremely difficult.

SUMMARY OF THE INVENTION

There may be a need to provide an adhesive joint, whereof the minimum mechanical load capacity and/or mechanical strength can be tested simply after production thereof, without complex testing and measuring systems for conducting strength and/or load capacity tests, directly with the adhesive joint as such. In addition, there may be a need to determine mechanical loading states directly in the adhesive joint.

This need may be met by a device having the features of patent claim 1.

The adhesive having several functional elements with actuatory and/or sensory properties, in particular to enable a minimum mechanical load capacity of the adhesive joint and/or detecting of a mechanical loading state inside the adhesive joint, simple and direct inspectability of the mechanical load capacity of components joined by the adhesive joint according to the invention may be possible with the adhesive joint as such. The inspection of the mechanical load capacity of the components joined by the adhesive joint according to the invention may be preferably performed nondestructively. Moreover, by the functional elements, strength testing of the adhesive joint may also possible. Furthermore, by the functional elements, mechanical loading states may be detected in the adhesive joint.

In accordance with an exemplary embodiment of the adhesive joint, a control signal is convertible, by the functional elements, into a mechanical stress inside the adhesive joint, in order to determine a minimum mechanical load capacity of the adhesive joint and/or a mechanical stress in the adhesive joint is convertible, by the functional elements, into a measuring signal in order to detect a mechanical loading state in the adhesive joint. This configuration of the adhesive joint according to the invention may enable driving the functional elements and/or an evaluating of the measuring signals output by the functional elements by a preferably automatically operating control and regulation device.

In another exemplary embodiment, in the region of the functional elements, provision is made for contact elements to be arranged for supplying and/or deriving the control signal and/or measuring signal. Thereby, a secure electric connection of the functional elements to the control and regulation device may be established.

Another exemplary embodiment provides for the control signal and/or measuring signal to be transmissible without contact. Due to the contactless coupling of the control signal and/or measuring signal to the control and regulation device, particularly convenient measuring of a minimum mechanical load capacity of the adhesive joint and/or the detection of a mechanical loading state in the adhesive joint may be possible, even in locations that are difficult to access.

Another exemplary embodiment of the adhesive joint provides for the control signal to be an electric voltage and/or an electric current. Thereby, the control signal in the control and regulation device may be generated and controlled simply, at least in part automatically.

Another exemplary embodiment of the adhesive joint provides for the measuring signal to be an electric voltage and/or an electric current. Thereby, the measuring signal in the control and regulation device may be analyzed simply and at least in part automatically.

According to another exemplary embodiment of the adhesive joint, the control signal is generatable in the control and regulation device and/or the measuring signal supplyable to the control and regulation device. By the control and regulation device, the minimum mechanical load capacity and/or the detection of a mechanical loading state in the adhesive joint may take place at least in part automatically.

In accordance with another exemplary embodiment, the adhesive is formed by a surface formation, in particular by an adhesive tape. This may ensure easy and fast application of the adhesive to the components to be joined. If necessary, the adhesive means embodied as an adhesive tape may comprise a protective film on one side and/or on both sides. Moreover, the adhesive means in the form of an adhesive tape may be easy to store as a roll.

According to another exemplary embodiment of the adhesive joint, the adhesive means is formed with liquid plastic, in particular with paste-like liquid plastic. This configuration, in particular with paste-like liquid plastic, may allow for the adhesive means to be applied even in locations that are difficult to access or in the region of adhesive joints that have at least locally an uneven surface topography.

Another exemplary embodiment of the adhesive joint provides for the functional elements to be embodied in particular in plate and/or strand shape. Due to the plate and/or strand shaped form of the functional elements, the largely trouble-free integration thereof into the matrix of the adhesive means may be ensured, for a plurality of geometric forms, so that the mechanical load capacity thereof may not be substantially affected. Moreover, plate and/or strand shaped functional elements may be easy to produce.

In accordance with another exemplary embodiment of the invention, the functional elements are formed with piezoelectric ceramics and/or piezoelectric polymers. This configuration may allow for both sensory and actuatory operation of the functional elements. In a preferred embodiment, the functional elements are formed by so called piezoelectric stacks, which yield large deformation paths even at relatively small electric excitations, and thus generate high mechanical stresses in the adhesive joint at good electric efficiency. In principle, the piezoelectric stacks are composed of or comprises several piezoelectric ceramic plates layered on top of each other, or adequately arranged piezoelectric elements of polymers. Other than in plate and/or stack shape, the functional elements can also be embodied in strand-shape, and in particular have the shape of filaments and/or fibers, which are integrated in the resin matrix of the adhesive joint.

According to another exemplary embodiment of the invention, the functional elements are formed at least in part by shape memory alloys. The use of shape memory alloys may enable the production of functional elements, which develop high mechanical forces and/or deformation paths even at relatively insignificant electric excitations. However, sensor-like operation of the functional elements, which are formed by shape memory alloys, may not be possible in general.

In accordance with another exemplary embodiment of the adhesive joint, a material thickness of the adhesive means is adjustable by the functional elements. Thereby, a defined distance of the components joined by the adhesive joint may be ensured. Therefore, it may be no longer necessary to introduce further additives into the adhesive means for adjusting a defined distance.

In addition, the need may be met by a method in accordance with an embodiment of the invention.

According to an exemplary embodiment the method comprises:
coupling a control signal into the functional elements, and
increasing the control signal up to a limiting value.

The method may allow for the mechanical load capacity and/or the mechanical strength of the adhesive joint to be inspected rapidly, easily, and directly. Herein, the limiting value of the control signal may preferably correspond to a mechanical stress in the adhesive joint, which may ensure a minimum mechanical load capacity of the adhesive joint. If required, the limiting value of the control signal for conducting strength tests can also be a mechanical stress with respect to mechanical strength of the adhesive joint.

An exemplary embodiment of the method provides for the control signal to be increased until a limiting value is reached, at which a mechanical stress is prevailing in the adhesive joint, which ensures a minimum mechanical load capacity of the adhesive joint. Thereby, the minimum load capacity of the adhesive joint may be determined easily.

Another exemplary embodiment of the method provides for the control signal to be increased until a limiting value is reached, at which a mechanical stress is prevailing in the adhesive joint, which exceeds a mechanical strength of the adhesive joint. Thereby, if required, strength values of the adhesive joint may also be determined easily. The control signal may then be increased until the adhesive joint fails mechanically.

Another exemplary embodiment of the method provides for a measuring signal to be decoupled from the functional elements in order to determine mechanical stress prevailing in the adhesive joint. Thereby, direct measuring of the mechanical stresses prevailing inside the adhesive joint may be enabled by the functional elements, in this case at least partially operated as sensors. Such measuring may be more precise than an indirect determination of the mechanical stress prevailing inside the adhesive joint via a measurement of the level of the external control voltage applied to the adhesive joint.

According to another exemplary embodiment an adhesive joint for joining components of means of transport, in particular of aircraft, wherein the adhesive joint is formed by an adhesive means is provided, wherein the adhesive means has several functional elements with actuatory and/or sensory properties, in particular for enabling a minimum mechanical load capacity of the adhesive joint and/or detecting a mechanical loading state in the adhesive joint.

According to another exemplary embodiment in an adhesive joint by means of the functional elements a control signal can be converted into a mechanical stress inside the adhesive joint in order to determine a minimum mechanical load capacity of the adhesive joint and/or by means of the functional elements a mechanical stress in the adhesive joint can be converted into a measuring signal for detecting a mechanical loading state in the adhesive joint.

According to another exemplary embodiment in an adhesive joint in the region of the functional elements contact elements are arranged for supplying and/or deriving the control signal and/or measuring signal.

According to another exemplary embodiment in an adhesive joint the control signal and/or measuring signal can be transmitted without contact.

According to another exemplary embodiment in an adhesive joint the control signal is an electric voltage and/or an electric current.

According to another exemplary embodiment in an adhesive joint the measuring signal is an electric voltage and/or an electric current.

According to another exemplary embodiment in an adhesive joint the control signal can be generated in a control and regulation device and/or the measuring signal can be supplied to the control and regulation device.

According to another exemplary embodiment in an adhesive joint the adhesive means is formed by a surface formation, in particular an adhesive tape.

According to another exemplary embodiment in an adhesive joint the adhesive means are formed by liquid plastic, in particular by paste-like liquid plastic.

According to another exemplary embodiment in an adhesive joint the functional elements are embodied in particular in plate and/or strand shape.

According to another exemplary embodiment in an adhesive joint the functional elements are formed by piezoelectric ceramics and/or piezoelectric polymers.

According to another exemplary embodiment in an adhesive joint the functional elements are formed at least in part by shape memory alloys.

According to another exemplary embodiment in an adhesive joint by means of the functional elements, a material thickness of the adhesive means can be set.

According to another exemplary embodiment a method for determining a minimum mechanical load capacity and/or mechanical strength of an adhesive joint for joining components of means of transport, in particular of aircraft is provided, wherein in the adhesive joint formed by an adhesive means, several functional elements with actuatory and/or sensory properties are integrated, the method comprising coupling a control signal into the functional elements, and increasing the control signal up to a limiting value.

According to another exemplary embodiment in a method the control signal is increased until a limiting value is reached, at which a mechanical stress prevails in the adhesive joint, which ensures a minimum mechanical load capacity of the adhesive joint.

According to another exemplary embodiment in a method the control signal is increased until a limiting value is reached, at which a mechanical stress prevails in the adhesive joint, which exceeds a mechanical strength of the adhesive joint.

According to another exemplary embodiment in a method a measuring signal is decoupled from the functional elements in order to determine the mechanical stress prevailing in the adhesive joint.

According to another exemplary embodiment in a method the control signal is increased until the measuring signal matches a mechanical stress ensuring the minimum mechanical load capacity of the adhesive joint.

According to another exemplary embodiment in a method the control signal and/or the measuring signal is transmitted via contact elements arranged in the region of the functional elements.

According to another exemplary embodiment in a method the control signal and/or the measuring signal is transmitted without contact.

According to another exemplary embodiment in a method an electric voltage and/or an electric current is used as the control signal.

According to another exemplary embodiment in a method an electric voltage and/or an electric current is used as the measuring signal.

According to another exemplary embodiment in a method the control signal is, generated in a control and regulation device and/or the measuring signal is supplied to the control and regulation device.

According to another exemplary embodiment in a method in particular piezoelectric ceramics and/or piezoelectric polymers are used as functional elements.

According to another exemplary embodiment in a method at least in part shape memory alloys are used as the functional elements.

Further exemplary embodiments of the adhesive device and the method for inspecting an adhesive joint are exposed in further patent claims.

DETAILED DESCRIPTION

In the figures identical or similar elements are marked with identical or similar reference signs.

Figure 1:
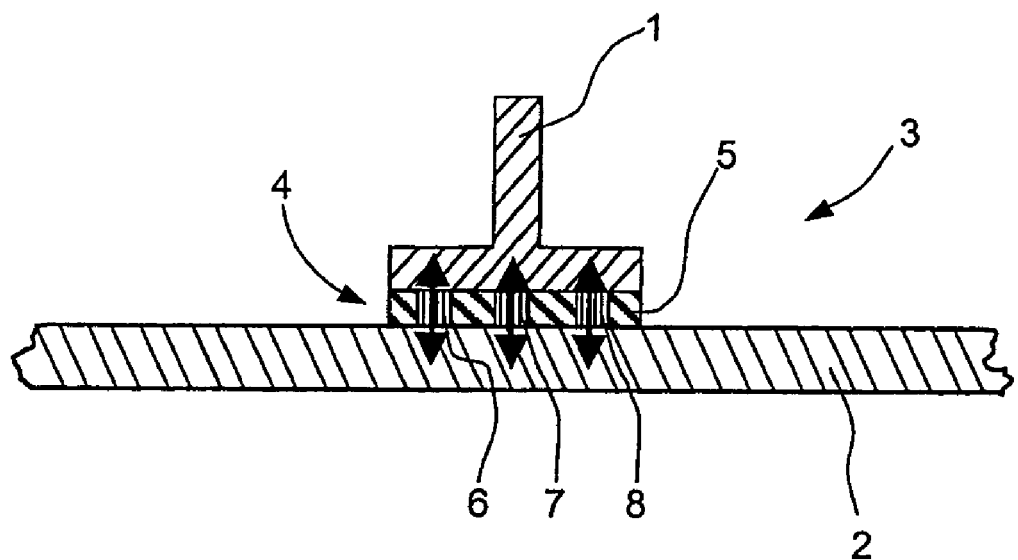
FIG. 1 shows a section through two components joined by the inventive adhesive joint in accordance with a first exemplary embodiment.

FIG. 1 shows a section through two components joined by the inventive adhesive joint according to a first exemplary embodiment.

A first component 1 is joined to a second component 2 by the inventive adhesive joint 3. Components 1, 2 can be formed of metal and/or a fiber reinforced plastic material, in particular carbon fiber reinforced epoxy resin.

The adhesive joint 3 is substantially formed by an adhesive means 4, which is arranged between the first and the second component 1, 2. In the exemplary embodiment shown, the adhesive means 4 is formed by an adhesive film 5. The adhesive film 5 is composed e.g. of an epoxy resin, which is curable by an appropriate effect of pressure and temperature. For joining the first component 1 to the second component 2, the adhesive film 5, if necessary after protective and/or cover films have been peeled off, is placed in the region of a desired joining surface between the first component 1 and the second component 2. Then, the components 1, 2 are glued solidly together through an appropriate effect of pressure, temperature, and time. When the adhesive joint has been completed, the adhesive film 5 transmits all forces occurring between the first component 1 and the second component 2.

According to the invention, in the exemplary embodiment shown, inside the adhesive film 5, three functional elements 6, 7, 8 are embedded, which are formed by piezoelectric ceramic plates. In a preferred embodiment, so called "piezoceramic stacks" are implemented as functional elements 6, 7, 8, which have high mechanical deformation energy at minimum electric energy input. The embedding or integration of the functional elements 6, 7, 8 is done e.g. when the adhesive film 5 is produced. Differently from the plate-shaped configuration shown of the functional elements 6, 7, 8, they can also be embodied in strand-shape,. e.g. as filaments. Further geometric configurations are possible in addition. The functional elements 6, 7, 8 are preferably positioned approximately matrix-like inside the adhesive film 5. Perpendicularly to the drawing plan of FIG. 1, there are consequently further functional elements, not represented here, which are arranged in parallel to the functional elements 6, 7, 8. Inside the adhesive film 5, any number of functional elements 6, 7, 8 can be integrated. Increasing the number of functional elements 6, 7, 8 embedded inside the adhesive film 5 enables the precision of the load measurement performed therewith to be improved.

By the functional elements 6, 7, 8, e.g. formed by a piezoelectric ceramic material, defined mechanical stresses can be generated inside the adhesive joint 3 for mechanical strength testing on the adhesive joint 3 (operation in actuator mode). Generating a mechanical stress is done herein so that e.g. an electric control voltage is applied to the functional elements 6, 7, 8 via contact elements, not represented in detail in the illustration of FIG. 1. The functional elements 6, 7, 8 then deform because of the piezoelectric effect according to the level of the electric control voltage applied and thereby generate a defined mechanical stress inside the adhesive joint 3, which according to the invention is made use of for inspecting the mechanical load capacity of the adhesive joint 3. In an alternative embodiment, the functional elements 6, 7, 8 can be formed at least in part by piezoelectric polymers or the like.

The main direction of deformation of the functional elements 6, 7, 8 extends e.g. in the direction of the three black double arrows plotted in the region of the adhesive film 5, so that due to an extension of the functional elements 6, 7, 8, the adhesive joint 3 is loaded substantially with mechanical stresses in this direction in space. Differently therefrom, the main direction of deformation can be generated by functional elements 6, 7, 8 with a different internal crystalline structure or through a different electric drive, e.g. also in parallel to the surfaces of the components 1, 2, in order to imitate a mechanical load of the adhesive joint 3 through shearing forces. Differently therefrom, also e.g. compressive forces can be generated inside the adhesive joint simply by inverting the control voltage by means of the functional elements 6, 7, 8.

For feeding the electric control voltage to the contact elements, the functional elements 6, 7, 8 moreover have connecting elements, not represented in detail. Both the contact elements and the connecting elements can be formed e.g. by metalized plastic films. The metalized plastic films are integrated in the adhesive film 5 and simultaneously support the functional elements 6, 7, 8.

Alternatively, the control voltage can also be coupled into the functional elements 6, 7, 8 without contact. In this case, the contact elements can be embodied e.g. as antennas for receiving electromagnetic alternating fields. The connecting elements can then be omitted at least in part.

For inspecting the mechanical load capacity of the adhesive joint 3, it is first required to determine empirically a limiting value for a control voltage, the value corresponding to a required minimum load capacity of the adhesive joint 3 including an increased factor for safety. If the control voltage is applied to the functional elements 6, 7, 8 to the extent of this limiting value, and the adhesive joint 3 withstands the internal mechanical stresses generated thereby, then it can be assumed that the adhesive joint 3 will also withstand all mechanical load types occurring in practical operation.

Thus, the adhesive joint 3 itself enables a rapid, simple and nondestructive inspection of the mechanical load capacity of the components 1, 2 joined via the adhesive joint 3. Generating and regulating the control voltage, as well as evaluating possible electric measuring voltages generated by the functional elements 6, 7, 8 for detecting the mechanical stresses existing inside the adhesive joint 3 is thereby done in a control and regulating device, not represented, which has e.g. appropriate electric measuring amplifiers, computing units, as well as corresponding electric power amplifiers and/or output amplifiers.

On the other hand, it is also possible to detect a mechanical stress existing inside the inventive adhesive joint 3 through the functional elements 6, 7, 8 (operation in sensor mode). As a matter of fact, due to the piezoelectric effect, every deformation of the functional elements 6, 7, 8 also leads to a measuring voltage at the functional elements 6, 7, 8, which matches the mechanical loading state and/or the mechanical stress existing within the adhesive joint 3. This deformation of the functional elements 6, 7, 8 can be generated either directly through forces acting from the outside, or indirectly through functional elements 6, 7, 8 being operated in actuator mode. Via the contact elements, the measuring voltage can then be transmitted to the external control and regulation device. From the level of the measuring voltage, it is then possible in the control and regulation device to determine through appropriate evaluation algorithms the mechanical load actually prevailing inside the adhesive joint 3. Each functional element 6, 7, 8 can herein serve both as an actuator for generating a mechanical stress through application of an electric control voltage (actuator mode), or as a sensor for converting a mechanical stress into an electric measuring voltage proportional thereto (sensor mode). The functional elements 6, 7, 8 can herein function either specifically in actuator mode or sensor mode, or else a time sequence is taking place between actuator mode and sensor mode (multiplex mode).

If in parallel to the modification of the control voltage applied to the functional elements 6, 7, 8, also a measurement of the mechanical stresses prevailing inside the adhesive joint 3 is performed by the functional elements 6, 7, 8 operated as sensors, then it is not necessary to determine empirically a limiting value for the electric control voltage to be applied, because a direct measurement of the mechanical stresses or the loading states prevailing in the adhesive joint 3 is performed.

For components 1, 2 having at least partially metallic constituents, both the control and measuring voltage can be supplied and/or derived directly via the components 1, 2, which are then locally electrically conductive. In this context, e.g. sandwich plates with at least locally metallic coatings and/or at least locally metalized coatings can be envisaged. For components 1, 2 made of carbon fiber reinforced epoxy resins, it is also possible to use e.g. already existing metallic inserts, such as lightning arresters, metal braids for discharging electric loads or the like, for conducting signals. Another possibility consists of an at least local doping of the adhesive film 5, e.g. with conductive particles. By applying an external magnetic alternating field it is then possible to generate an electric field in the adhesive film 5 in the doping region, which field results in the desired defined deformations of the functional elements 6, 7, 8 and thus the intended mechanical stresses in the adhesive joint 3.

If the functional elements 6, 7, 8 are at least partially embodied as metal shape memory alloys, e.g. for achieving higher efficiency in actuator mode and thus greater mechanical stresses in the adhesive joint 3, operation in sensor mode is not possible in general. For controlling the shape memory alloys, usually their temperature has to be varied, which can be done e.g. by coupling an electric current, which results in a corresponding temperature rise. Controlled temperature variation can also be performed without contact, e.g. through eddy currents or the like, inductively generated inside the shape memory alloy.

Moreover, the functional elements 6, 7, 8 are for ensuring a minimum gap between the first and second components 1, 2 to achieve an exactly defined height of the resulting adhesive joint 3 between the components 1, 2. The use of additional additives or filling materials can thus be omitted at least in part.

Figure 2:
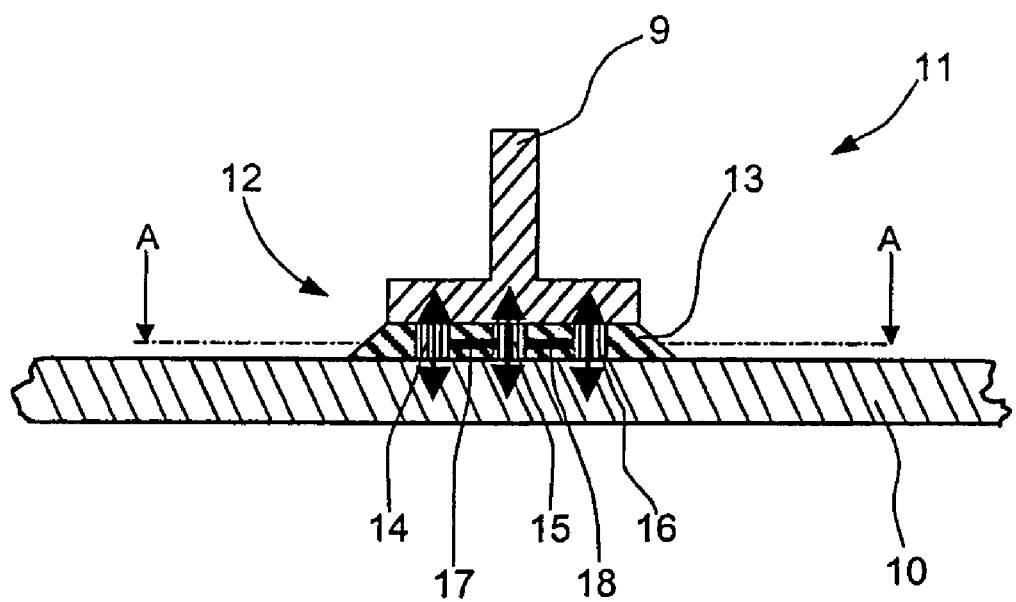
FIG. 2 shows a section through two components joined by the inventive adhesive joints in accordance with a second exemplary embodiment.

FIG. 2 shows a sectional view of two components joined by the inventive adhesive joint in accordance with a second exemplary embodiment.

A first component 9 is joined to a second component 10 by an adhesive joint 11. Differently from the exemplary embodiment in accordance with FIG. 1, the adhesive means 12 is herein not an adhesive film but a paste-like adhesive 13. The adhesive 13 can be for instance a curable epoxy resin with or without fiber reinforcement. Inside the adhesive 13, functional elements 14, 15, 16 formed e.g. by piezoelectric ceramics, in particular piezoelectric stacks, are arranged. The spatial arrangement of the functional elements 14, 15, 16 substantially corresponds to the arrangement of the functional elements 6, 7, 8 in FIG. 1. The three black double arrows in the region of the adhesive 13 again symbolize the main direction of deformation of the functional elements 14, 15, 16 when the control voltage is applied. In contrast to the embodiment in accordance with FIG. 1, the functional elements 14, 15, 16 are herein respectively joined by small webs 17, 18, so that when the paste-like adhesive 13 is applied during the assembly process, the strength of the matrix-like arrangement of the functional elements 14, 15, 16 is not substantially affected. Regarding further technical details of the functional elements 14, 15, 16, reference is made to the explanations provided with regard to the description of FIG. 1.

Figure 3:
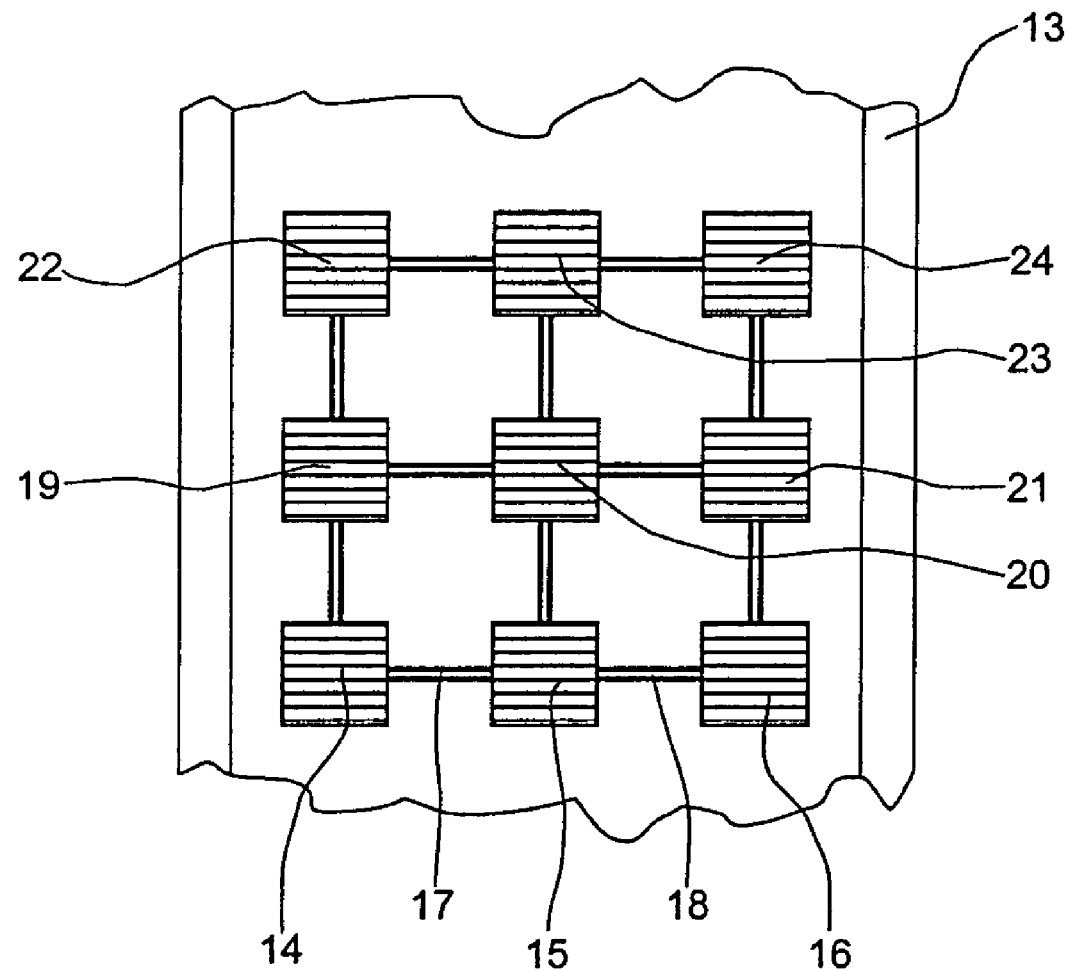
FIG. 3 shows a section through the adhesive joint in accordance with the second exemplary embodiment along cutting line A-A in FIG. 2.

FIG. 3 shows a section through the adhesive joint in accordance with the second exemplary embodiment along. a cutting line A-A in FIG. 2. In a lower row of the matrix-like arrangement, the functional elements 14, 15, 16 are arranged preferably at equally spaced intervals to each other. Herein, the functional elements 14, 15, 16 are joined together by the webs 17, 18. The detail shown of the matrix-like structure continues upwards with the further functional elements 19-24, which are joined together by webs, not designated in detail in the illustration of FIG. 3, embodied correspondingly to webs. 17, 18. Correspondingly, the matrix-like arrangement of the functional elements also continues further downwards. Unlike the geometrical arrangement shown, the functional elements 14, 15, 16 and 19-24 can be positioned with respect to each other in any possible way and number. The webs 17, 18 can e.g. be part of a reticulated structure, with the functional elements then arranged in the nodes thereof. The webs 17, 18 primarily ensure the alignment of the functional elements 14-16 during the application of the adhesive 13, in this case preferably paste-like, for forming the adhesive means 12. The further webs correspondingly ensure the alignment of the functional elements 19-24. Moreover, the webs can be embodied to be at least locally electrically conductive in order to couple the control voltage and/or the measuring voltage to the functional elements 14-16, 19-24. In the case of contactless coupling of the control voltage and/or measuring voltage to the control and regulation device, the webs can also be embodied as antennas for receiving or emitting electromagnetic waves.

Figure 4:
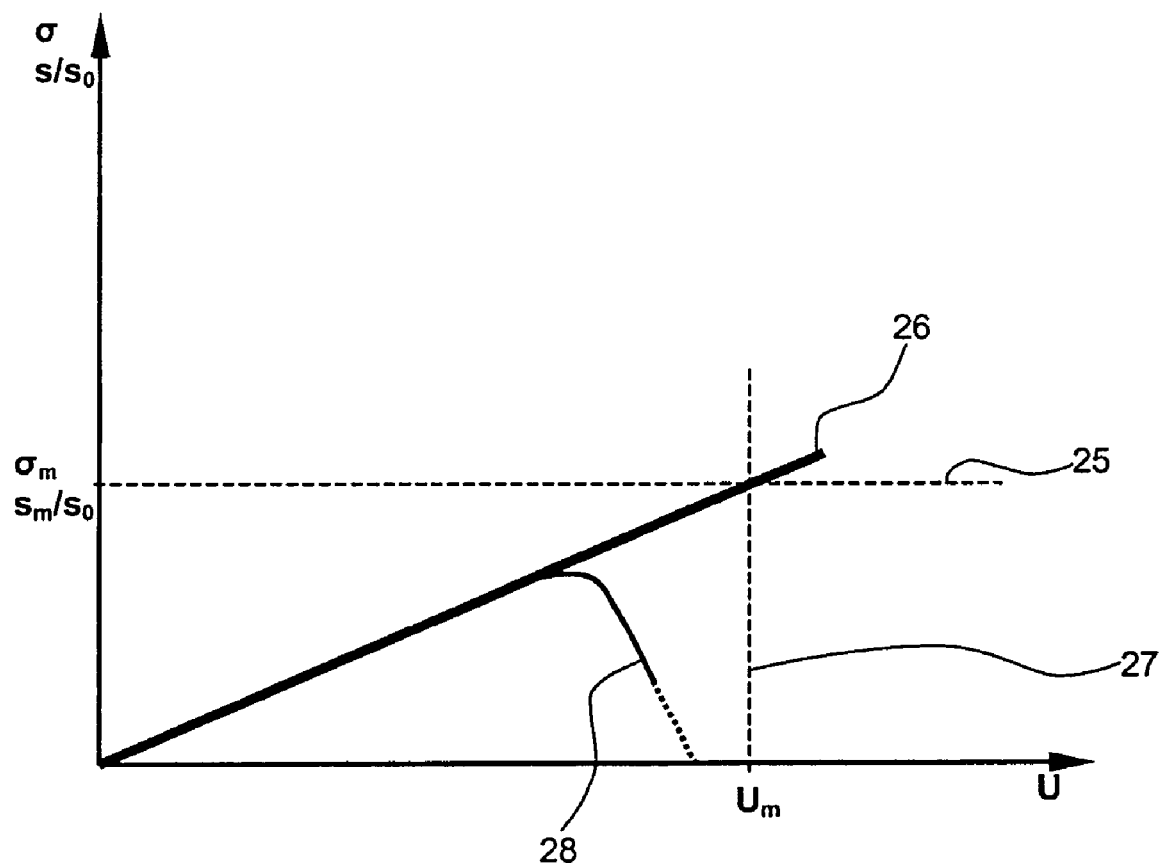
FIG. 4 shows a diagram for the schematic sequence of the inventive method.

FIG. 4 schematically illustrates the sequence of the inventive method using the example of the adhesive joint 3 in accordance with FIG. 1. The method is applicable correspondingly to the adhesive joint 11 in accordance with FIG. 2.

On the ordinate of the diagram represented in FIG. 4, the mechanical stresses $\sigma$ or the relative strain $s/s_o$ of the adhesive joint 3, prevailing in the adhesive joint 3, are plotted. On the abscissa, the level of the control voltage U applied is represented. The horizontal dotted subsidiary line 25 then corresponds to a minimum mechanical stress $\sigma_m$ and/or a minimum strain $s_m/s_o$, which the adhesive joint 3 still has to bear securely in order to exclude with a sufficiently high probability under all possible actual loading states of the adhesive joint 3 the mechanical failure thereof in operation. Herein, the straight line 26 drawn with bold line width represents an electric control voltage U respectively applied to the functional elements 6, 7, 8 during the procedure. The course of control voltage U can be any time course deviating from the straight line 26, e.g. including a non linear one. Instead of the control voltage, it is also possible to impress a control current in the functional elements 6, 7, 8.

During the sequence of the inventive method, the electric control voltage U applied to the functional elements 6, 7, 8 is increased progressively or continuously by the control and regulation device until the mechanical stress $\sigma$ reaches a minimum stress $\sigma_m$ inside the adhesive means 4, which corresponds to the horizontal dotted subsidiary line 25. In general, this is the case when the control voltage U reaches a minimum electric voltage $U_m$, represented by the vertical dotted subsidiary line 27. The amount of the minimum voltage $U_m$ to be applied respectively to the functional elements 6, 7, 8, which the adhesive joint 3 still has to withstand in order to ensure a sufficient mechanical minimum load capacity, is determined empirically.

This can be done for instance through a conventional tensile test with the adhesive joint 3, wherein a known tensile force acts upon the adhesive joint 3, which results in a measurable test strain $s_{Test}/s_o$ of the adhesive joint 3. Measuring the test strain $s_{Test}/s_o$ of the adhesive joint 3 can be done e.g. without contact through laser interferometry. Next, an electric test voltage $U_{Test}$ is applied to the adhesive joint 3, at which approximately the same relative test strain $s_{Test}/s_o$ occurs as for the previous tensile test. The amount of this electric test voltage $U_{Test}$ is measured and then represents for the-following strength measurements by the inventive method the minimum voltage $U_m$ of the electric control voltage U to be applied, which an adhesive joint to be tested has to withstand reliably.

Alternatively, it is also possible to detect the mechanical stresses $\sigma$ prevailing in the adhesive joint 3 directly through the functional elements 6, 7, 8, with the functional elements 6, 7, 8 then functioning at least partly in sensor mode. In this case, the control and regulation device first increases the control voltage U applied to the functional elements 6, 8, e.g. operated as actuators, until the evaluation of the measuring voltage of the functional element 7 functioning as a sensor produces a level of the electric voltage which corresponds to the minimum mechanical stress $\sigma_m$ and/or a minimum strain $s_m/s_o$, which the adhesive joint 3 still has to withstand reliably. At this point, the control and regulation device stops the voltage increase of the control voltage U at the functional elements 6, 8 operated as actuators, so that the mechanical stress in the adhesive joint 3 does not further increase, and damage and/or destruction of the adhesive joint 3 is avoided.

If the adhesive joint 3 withstands without any visible mechanical impairment this level of the control voltage U applied, which allows an internal minimum mechanical stress of $\sigma_m$ or a minimum strain of $s_m/s_o$ to be derived based on the measuring voltage, then the adhesive joint 3 tested by the inventive method satisfies the structurally mechanically required minimum load capacity. Thus, it can be assumed that the adhesive joint 3 tested also reliably withstands all actual mechanical loading states occurring in permanent operation. The components 1, 2 joined by the adhesive joint 3 tested according to the invention can be implemented in production without hesitation.

However, if the adhesive joint 3 already fails before reaching the minimum stress $\sigma_m$ and/or before reaching the minimum electric voltage $U_m$, e.g. through excessive strain, rupture, local peeling or the like, which is represented in the diagram of FIG. 4 by a curve 28 breaking off and dotted at the end region, the adhesive joint 3 and/or the components 1, 2 joined thereby must be discarded and can no longer be used in production after testing.

By the inventive method, it may thus be possible to inspect adhesive joints easily, rapidly and directly, without requiring the execution of costly tensile tests with sophisticated measuring and testing systems for mechanical load capacity and/or mechanical strength thereof. In addition, by the inventive method, it may also be possible to conduct load tests on adhesive joints at locations that are difficult to access. Furthermore, the load tests on the adhesive joints can also be conducted without contact.

It should be noted that the term "comprising" does not exclude other elements or steps and the "a" or "an" does not exclude a plurality. Also elements described in association with different embodiments may be combined. It should also be noted that reference signs in the claims shall not be construed as limiting the scope of the claims.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

Reference list
1 first component
2 second component
3 adhesive joint
4 adhesive means
5 adhesive film
6 functional element
7 functional element
8 functional element
9 first component
10 second component
11 adhesive joint
12 adhesive means
13 adhesive
14 functional element
15 functional element
16 functional element
17 web
18 web
19 functional element
20 functional element
21 functional element
22 functional element
23 functional element
24 functional element
25 subsidiary line
26 straight line
27 subsidiary line
28 curve

The invention claimed is:

1. An adhesive joint for joining components of transport craft, the adhesive joint comprising:
an adhesive means comprising
a first plurality of functional elements adapted to convert a control signal into a mechanical stress inside the adhesive joint, and
a second plurality of functional elements adapted to convert a mechanical stress inside the adhesive joint into a measuring signal for detecting a mechanical loading state in the adhesive joint,
wherein the adhesive joint is formed by the adhesive means.

2. The adhesive joint according to claim 1, further comprising:
contact elements arranged in a region of the first plurality of functional elements and the second plurality of functional elements,
wherein the contact elements are adapted to supply and/or to derive the control signal and/or measuring signal.

3. The adhesive joint according to claim 1,
wherein the adhesive joint is adapted in such a way that the control signal and/or measuring signal is transmittable without contact.

4. The adhesive joint according to claim 1,
wherein the control signal is an electric voltage and/or an electric current.

5. The adhesive joint according to claim 1,
wherein the measuring signal is an electric voltage and/or an electric current.

6. The adhesive joint according to claim 1,
wherein the control signal is generatable in a control and regulation device and/or the measuring signal is supplyable to the control and regulation device.

7. The adhesive joint according to claim 1,
wherein the adhesive means is formed by a surface formation.

8. The adhesive joint according to claim 1,
wherein the adhesive means is a plastic.

9. The adhesive joint according to claim 1,
wherein at least one of the first and the second pluralities of functional elements have plate and/or strand shape.

10. The adhesive joint according to claim 1,
wherein the first and the second pluralities of functional elements are formed by piezoelectric ceramics and/or piezoelectric polymers.

11. The adhesive joint according to claim 1,
wherein the plurality of functional elements are formed at least in part by shape memory alloys.

12. The adhesive joint according to claim 1,
wherein the first and the second pluralities of functional elements are adapted in such a way that a material thickness of the adhesive means is setable.

* * * * *